Figure 1:
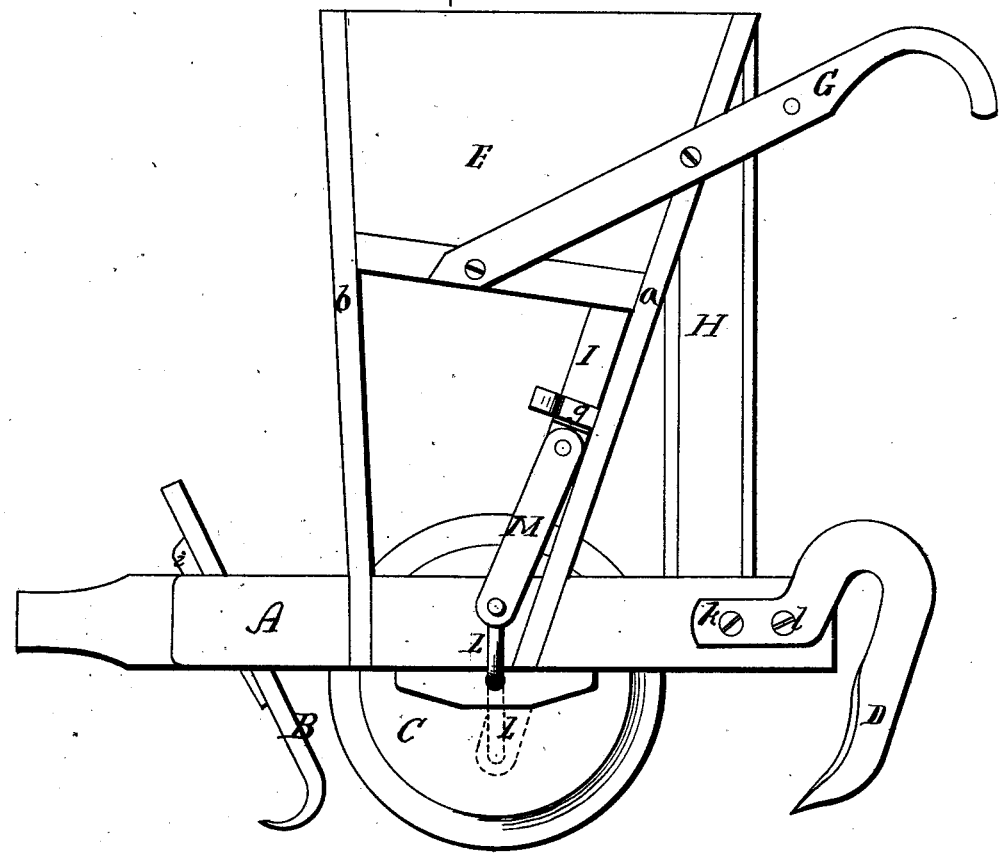

2 Sheets—Sheet 1.

J. RAND.
CORN-PLANTER.

No. 190,900.        Patented May 15, 1877.

WITNESSES        INVENTOR,
E. M. Gallaher.    Jackson Rand,
Geo. W. Brown.   By   J. S. Brown, his Attorney.

2 Sheets—Sheet 2.
J. RAND.
CORN-PLANTER.
No. 190,900. Patented May 15, 1877.
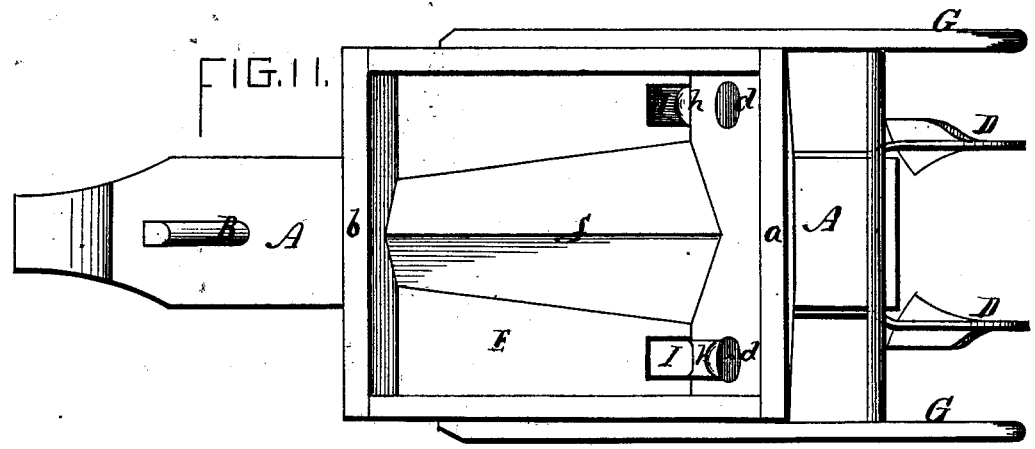
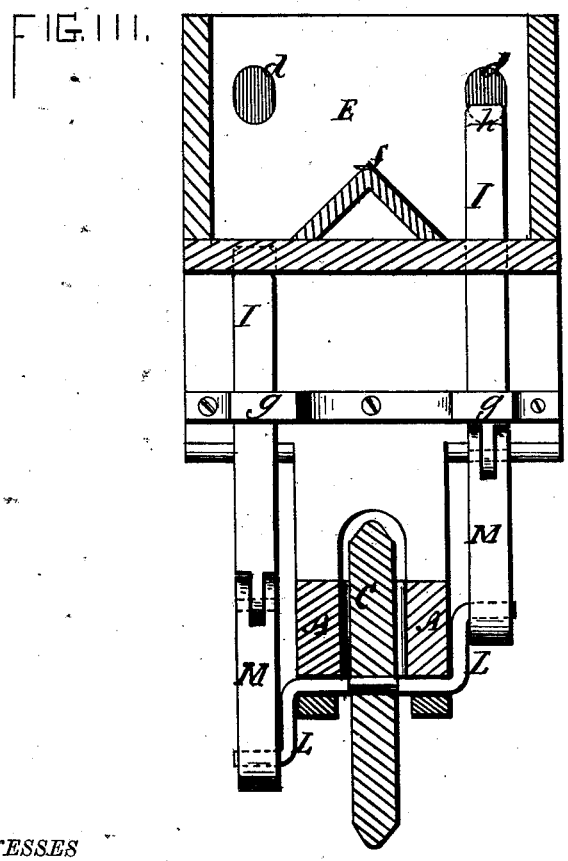
WITNESSES
E. M. Gallaher.
Geo. W. Brown
INVENTOR
Jackson Rand,
By J. S. Brown, his Attorney.
N. PETERS, PHOTO-LITHOGRAPHER, WASHINGTON, D. C.

UNITED STATES PATENT OFFICE.

JACKSON RAND, OF RED BANKS, MISSISSIPPI.

IMPROVEMENT IN CORN-PLANTERS.

Specification forming part of Letters Patent No. 190,900, dated May 15, 1877; application filed February 29, 1876.

*To all whom it may concern:*

Be it known that I, JACKSON RAND, of Red Banks, in the county of Marshall and State of Mississippi, have invented an Improved Corn-Planter; and I do hereby declare that the following is a full and exact description thereof, reference being had to the accompanying drawings, making part of this specification—

Figure 1 being a side view of the improved corn-planter; Fig. 2, a top view of the same; Fig. 3, a transverse vertical section thereof.

Like letters designate corresponding parts in all of the figures.

My invention is for the purpose of planting Indian corn, pease, beans, and other seeds to be planted in hills or drills; and it performs the entire work of opening the ground, dropping the seeds, and covering them.

The features of novelty consist in the construction, as hereinafter specified.

A beam, A, of suitable form and size, is provided, upon and in which the other parts of the machine are mounted. These main parts, in the beam itself, are an opening drill-tooth or share, B, near the front end; a driving and dropping wheel, C, serving also to further open and to shape the furrow in which the seeds are dropped, near the middle; and the covering drill teeth or shares D D, near the rear end of the beam.

Above the beam is the seed box or hopper E, supported by two standards, a b, which are secured to the beam at their lower ends, and may be broad in the direction transverse to the beam, and themselves form the front and rear sides of the seed-box. The position of the rear side a is, and that of the front side b may be, inclined, the former backward and the latter forward, from a perpendicular position, substantially as shown.

Handles G G, to guide and keep the implement upright, are attached to the sides of the seed-box.

The features of construction which I shall now describe comprise the particular points of my invention.

From the inclined rear side a of the seed-box E a spout or conveyer, H, leads down to and through the beam A, through which conveyer the grains of corn and other seeds are conducted from the seed-box and dropped into the seed-furrow. This conveyer is wide enough at the upper end to receive the grain from two or more seed-dropping apertures, d d, through the rear side of the seed-box, near the upper edge thereof. Two such seed-openings are shown in the drawings, receiving the seed from two divisions of the seed-box, partially separated by a partition, f, on the bottom of the seed-box, it having its upper surface inclined from the central longitudinal line laterally each way, so as to conduct the seeds to, and concentrate them around, two dropping-plungers, I I, which I employ for dropping the corn and other seeds, and for regulating the quantity thereof to be planted on a given surface of ground. These plungers have a reciprocating sliding movement up and down, close to the inner surface of the rear side a of the seed-box. They move in apertures in the bottom of the seed-box, the sides of which apertures closely surround them; and, farther down, they may be kept in position by retaining-guides g g, secured to the rear hopper-standard a, substantially as shown.

The reciprocating movement is communicated to the plungers by means of cranks L L on the ends of the shaft of the driving-wheel C, and of connecting-rods M M, extending from the said cranks to the lower ends of the respective plungers, to which they are pivoted.

The cranks L L project in opposite directions from the shaft-axis, so that the plungers alternate up and down in their movements.

The edge of the wheel C is double-beveled, as shown, so as to farther open and properly shape the seed-furrow.

The plungers, at the extremity of their respective downward movements, are in such positions that their upper ends are nearly or quite sunk to the bottom of the seed-box; and at the extremity of their upward movements they reach up to the bottom of the seed-receiving holes through the rear side of the seed-box, and opening into the seed-conveyer behind.

The form of the upper end h of each plunger is peculiar, and specially adapted to the purpose. For a part—one-half, more or less, or even all—of their thickness from front to rear these plunger ends are inclined backward, and are a little concave or cup-shaped, so as to hold one or more seeds or grains of corn, in connection with the rear inclined side of the seed-box. Thus, when the plunger ascends through the corn in the seed-box, one or more grains thereof will remain on its concave end till it reaches the aperture $d$ in the rear side of the seed-box, when the grains will immediately fall back through the aperture into the seed-conveyer, and thence into the furrow in the ground. The holes $d\,d$ in the back of the seed-box are either shielded from the mass of corn in the seed-box, or the seed-box is not filled quite up thereto.

The distance between the hills in the ground is determined by the circumference of the wheel C, which should be double the distance required for the two plunger-cranks on its shaft. The number of grains deposited in each hill is determined by the size of the apertures $d\,d$ in the back side of the seed-box, or by the size of the concavity in the upper ends of the plungers, different plungers, or different sizes of caps upon them, being used for different numbers of seeds to be dropped; or two or more sets of plungers for each crank may be employed, either all in connection with the rear side of the seed-box, or part of them in connection with the front side of the seed-box, a suitable conveyer conducting downward therefrom. At different times more or fewer of these plungers are to be brought into operation.

By using additional plungers in connection with the front side of the seed-box, plaster or other kinds of seeds may be dropped at the same time as the corn, there being suitable compartments in the seed box or hopper to hold the plaster or other seeds than the corn.

The depth of the opening-share B is regulated by loosening the wedge or key $i$, which holds it in the beam A, and, after shifting the share to the right position, tightening the key again; or any equivalent means may be employed for the purpose.

The depth of the covering-shares D D is regulated by means of two screws or bolts, $k\,l$, which attach each to the side of the beam A. The front bolt, $k$, serves as a pivot for the adjustment, and the rear bolt, $l$, is to be inserted into either one of a set of holes in the beam.

Any other suitable device may be employed instead of that above described.

There may be a suitable drag block or blocks, to be drawn behind the planter, to shape and smooth off the ridge covering the seed-furrow.

What I claim as my invention, and desire to secure by Letters Patent, is—

In a corn-planter, the combination of a seed-box, E, constructed with two compartments, partially separated by a doubly-inclined partition, $f$, and with an inclined back, $a$, having seed-dropping cavities $d\,d$ through the same, two inclined alternately-reciprocating plungers, I I, constructed with backwardly-inclined seed-holding tops or concavities, $h\,h$, and a conveyer, H, all arranged and operating substantially as and for the purpose herein specified.

JACKSON RAND.

Witnesses:
 A. Q. WITHERS,
 M. H. BOYD.